(12) United States Patent
Huang et al.

(10) Patent No.: US 8,248,773 B2
(45) Date of Patent: Aug. 21, 2012

(54) PORTABLE ELECTRONIC DEVICE AND UNLOCKING METHOD THEREOF

(75) Inventors: Po-Tai Huang, Tu-Cheng (TW); Chun-Fang Weng, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 192 days.

(21) Appl. No.: 12/884,213

(22) Filed: Sep. 17, 2010

(65) Prior Publication Data

US 2012/0026665 A1    Feb. 2, 2012

(30) Foreign Application Priority Data

Jul. 29, 2010    (TW) ................................ 99125063 A

(51) Int. Cl.
| H05K 5/00 | (2006.01) |
| H05K 7/00 | (2006.01) |
| G05B 19/10 | (2006.01) |
| H04N 5/228 | (2006.01) |
| G01F 15/06 | (2006.01) |
| G01B 7/00 | (2006.01) |

(52) U.S. Cl. ............ 361/679.21; 361/679.26; 361/679.3; 361/679.55; 361/679.56; 348/208.1; 377/19; 377/24; 318/567

(58) Field of Classification Search ............ 361/679.21, 361/679.26, 679.3, 679.55, 679.56; 348/208.1; 377/19, 24; 318/567
See application file for complete search history.

(56) References Cited

U.S. PATENT DOCUMENTS

| 5,329,277 A * | 7/1994 | Dougan et al. ................. 340/971 |
| 6,473,483 B2 * | 10/2002 | Pyles .............................. 377/24 |
| 2001/0022828 A1 * | 9/2001 | Pyles ........................... 377/24.2 |
| 2006/0152589 A1 * | 7/2006 | Morrison et al. ........... 348/208.1 |
| 2006/0291149 A1 * | 12/2006 | Suzuki et al. .................. 361/679 |

* cited by examiner

*Primary Examiner* — Anthony Haughton
(74) *Attorney, Agent, or Firm* — Altis Law Group, Inc.

(57) ABSTRACT

A method executes an altimeter function to unlock a portable electronic device. A user can move the portable electronic device in an up-down direction to set a predetermined changed height for unlocking the portable electronic device. In an unlock procedure, an altimeter detects a changed height of the portable electronic device and outputs detected information of the portable electronic device. If the changed height is the same as the predetermined changed height, the locked portable electronic device is unlocked.

8 Claims, 3 Drawing Sheets

PORTABLE ELECTRONIC DEVICE AND UNLOCKING METHOD THEREOF

BACKGROUND

1. Technical Field

Embodiments of the present disclosure relate to unlocking methods of an electronic device, and more particularly to a method for unlocking screen by using a altimeter and a storage medium thereof.

2. Description of Related Art

A common unlocking technique for a portable electronic device is to input an alpha-numeric pass code using a physical keypad of the portable electronic device or a virtual keypad displayed on a touch screen of the portable electronic device. However, remembering the alpha-numeric pass codes may be difficult to the user. What is needed, therefore, is an unlocking system and method of the portable electronic device to overcome the limitations described.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

In general, the word "module" as used herein, refers to logic embodied in hardware or firmware, or to a collection of software instructions, written in a programming language, such as, for example, Java, C, or Assembly. One or more software instructions in the module may be embedded in firmware, such as an EPROM. It will be appreciated that module may comprise connected logic units, such as gates and flip-flops, and may comprise programmable units, such as programmable gate arrays or processors. The module described herein may be implemented as either software and/or hardware module and may be stored in any type of computer-readable medium or other computer storage device.

Figure 1:
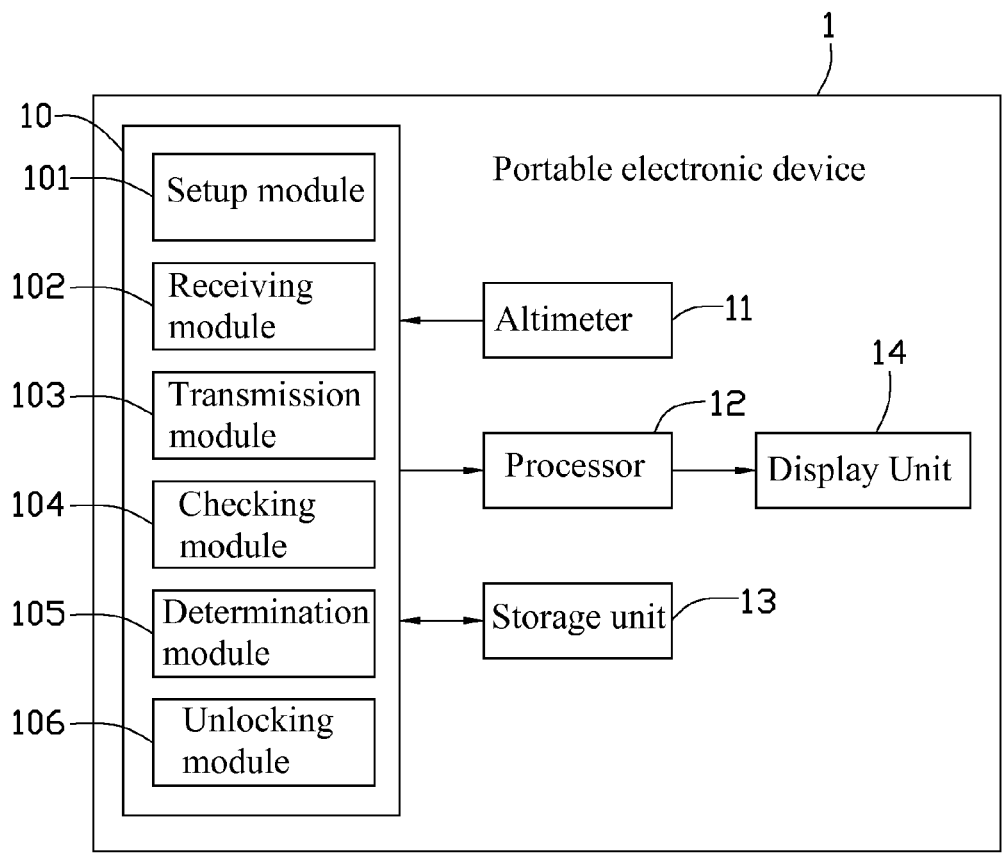
FIG. 1 is a block diagram of one embodiment of a portable electronic device.

FIG. 1 is a block diagram of one embodiment of a portable electronic device 1. Depending on the embodiment, the portable electronic device 1 can be a mobile phone, a personal digital assistant (PDA), a handheld game console, a digital camera (DC) or a handheld computer. The portable electronic device 1 includes a system 10, an altimeter 11, a processor 12, a storage unit 13, and a display unit 14. The system 10 further includes a setup module 101, a receiving module 102, a transmission module 103, a checking module 104, a determination module 105, and an unlocking module 106.

The portable electronic device 1 is generally controlled and coordinated by an operating system software, such as UNIX, Linux, Windows 95, 98, NT, 2000, XP, Vista, Mac OS X, an embedded operating system, or any other compatible operating systems. In other embodiments, the portable electronic device 1 may be controlled by a proprietary operating system. Conventional operating systems control and schedule computer processes for execution, perform memory management, provide file system, networking, and I/O services, and provide a user interface, such as a graphical user interface (GUI), among other things.

The modules 101-105 may comprise computerized code in the form of one or more programs that are stored in the storage unit 13 (or memory). The computerized code includes instructions that are executed by the at least one processor 12 to provide functions for modules 101-105. In addition, the processor 12 executes a changed height calculation of the portable electronic device 1. In one embodiment, the processor 12 calculates a changed height of the portable electronic device 1 based on an original height and a detected height of the portable electronic device 1. The processor 12 then sends the changed height to the receiving module 102.

The storage unit 13 is electronically connected to the altimeter 11, the processor 12, the setup module 101, the receiving module 102, the transmission module 103, the checking module 104, the determination module 105 and the unlocking module 106. The storage unit 13 is operable to store many kinds of data, such as the original height information, height information, the changed height information, a customization function code of the portable electronic device 1, computerized codes of the system 10, programs of an operating system and other applications of the portable electronic device 1. The storage unit 13 may include a hard disk drive, flash memory, RAM, ROM, cache, or external storage mediums.

The display unit 14 displays information related to the height information and the changed height information of the portable electronic device 1. The display unit 14 can be a display screen, a resistive touch screen, or a capacitive touch screen.

The altimeter 11 is operable to detect the height of the portable electronic device 1. The altimeter 11 firstly detects an air pressure surrounding the portable electronic device 1, and then detects the height of the portable electronic device 1 according to the relationship between height and pressure. Accordingly, the system 10 can detect the original height of portable electronic device 1 before moving the portable electronic device 1. The system 10 further detects the changed height in respect to the original height of the portable electronic device 1 during a moving period. In addition, the system 10 saves the original height and the changed height of the portable electronic device 1 to the storage unit 13.

In one embodiment, if the detected changed height in respect to the original height of a moving portable electronic device 1 is moving upwardly, the system 10 can detect the changed height of portable electronic device 1 as positive value. Otherwise, if detected changed height of the moving portable electronic device 1 in respect to the original height is moving downwardly, the system 10 can detect the changed height of portable electronic device 1 as negative value. For example, the altimeter 11 detects the original height of the portable electronic device 1 as 1 m. If the portable electronic device 1 moves upwardly 20 cm in respect to the original height, the altimeter 11 detects the height of the portable electronic device 1 as 20 cm and the system 10 detects the changed height of the portable electronic device 1 equal to +20 cm by calculating with the processor 12. Accordingly, the system 10 detects the changed height equal to −20 cm if the portable electronic device 1 moves downwardly 20 cm in respect to the original height.

The receiving module 102 is operable to receive the height of portable electronic device 1 form the altimeter 11 and save the received height to the storage unit 13. In addition, the receiving module 102 saves the changed height of the portable electronic device 1 calculated by the processor 12 and saves the changed height to the storage unit 13.

Figure 2:
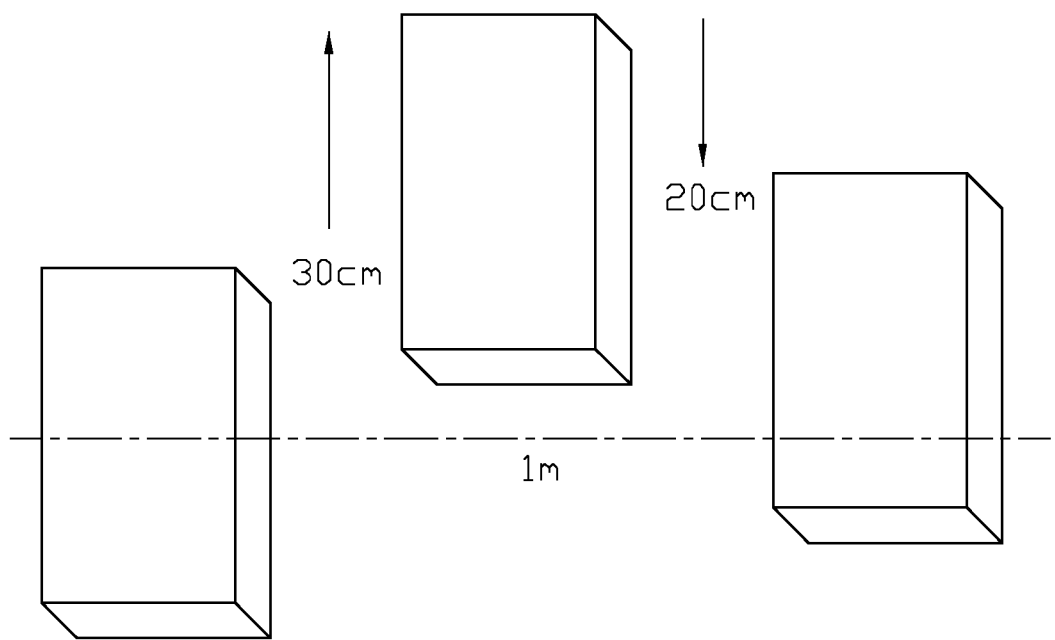
FIG. 2 is a schematic diagram of the portable electronic device of FIG. 1 setting predetermined conditions for an unlocking operation.

The setup module 101 is operable to set a predetermined changed height and a predetermined time period to unlock the portable electronic device 1. In one embodiment, as shown in FIG. 2, setting predetermined conditions for unlocking operation of the portable electronic device 1 is illustrated. First, the altimeter 11 detects the original height of the portable electronic device 1 as 1 m. The user moves the portable electronic device 1 with a 30 cm upward movement, finally moves the portable electronic device 1 with a 20 cm downward movement. Accordingly, the processor 12 can calculate the changed height of the upward movement equal to +30 cm and the changed height of the downward movement equal to −20 cm. The processor 12 further can calculate a total changed height equal to +10 cm in respect to the original height. The setup module 101 can set the changed height of the upward movement +30 cm and the changed height of the downward movement −20 cm as the predetermined changed height for unlocking the portable electronic device 1. The setup module 101 can further set the total changed height 10 cm as the predetermined changed height. Furthermore, the setup module 101 saves the predetermined changed heights to the storage unit 13 for unlocking the portable electronic device 1.

In other embodiments, the predetermined changed heights for unlocking the portable electronic device 1 are set at the first changed height of the upward movement +30 cm and the second changed height of the downward movement −20 cm by the setup module 101. If the user moves the portable electronic device 1 with a 30 cm upward movement, then moves the portable electronic device 1 with a 10 cm downward movement. At the same time, the display unit 14 can display the changed height information from the value 0 to +30 cm at the first movement and +30 cm to +20 cm at the second movement. And the portable electronic device 1 is still locked in response to the detected changed height being different to the predetermined changed height for unlocking the portable electronic device 1. If the user wants to unlock the portable electronic device 1, the user can continually move the device 10 cm downwardly and the display unit 14 can display the changed height information from +30 cm to +10 cm. This result of the changed height is equal to the predetermined changed height for unlocking the device. Then the portable electronic device 1 is unlocked.

In addition, the setup module 101 is also operable to set a predetermined time period. For example, the setup module 101 sets the predetermined time period equal to 0.5 second.

The transmission module 103 is operable to transmit the changed height from the receiving module 102 to the display unit 14 to notice users.

The checking module 104 is operable to determine whether the changed height stored in the storage unit 13 changes within the predetermined time period. This checking module 104 is developed to check whether the movement of the portable electronic device 1 for unlocking is finished. For example, if the changed height stored in the storage unit 13 does not change within the predetermined time period, the checking module 104 determines the movement of the portable electronic device 1 is finished. Otherwise, the checking module 104 determines the movement of the portable electronic device 1 is continually moving. The predetermined time period is set as a prior time period to a current time. For example, if the current time is 09:40:40 a.m. and the predetermined time period is 0.5 second, the time period is set form 09:39:39.5 a.m. The checking module 104 determines whether the changed height stored in the storage unit 13 changed during a period of 09:39:39.5 a.m. and 09:40:40 a.m.

The determination module 105 is operable to determine whether the changed height is the same as the predetermined changed height if the changed height changed within the predetermined time period. In one embodiment, if the checking module 104 determines the changed height changed within the predetermined time period, the determination module 105 reads the changed height and the predetermined changed height stored in the storage unit 13. Continually, the determination module 105 determines whether the changed height is the same as the predetermined changed height. If the changed height is not the same as the predetermined changed height, the determination module 105 determines that the portable electronic device 1 keeps locked. If the changed height is the same as the predetermined changed height the determination module 105 sends an unlocking signal to the unlocking module 106.

The unlocking module 106 is operable to receive the unlocking signal from the determination module 105 and unlock the portable electronic device 1. For example, the unlocking module 106 unlocks the portable electronic device 1 by unlocking a screen lock or a key lock.

Figure 3:
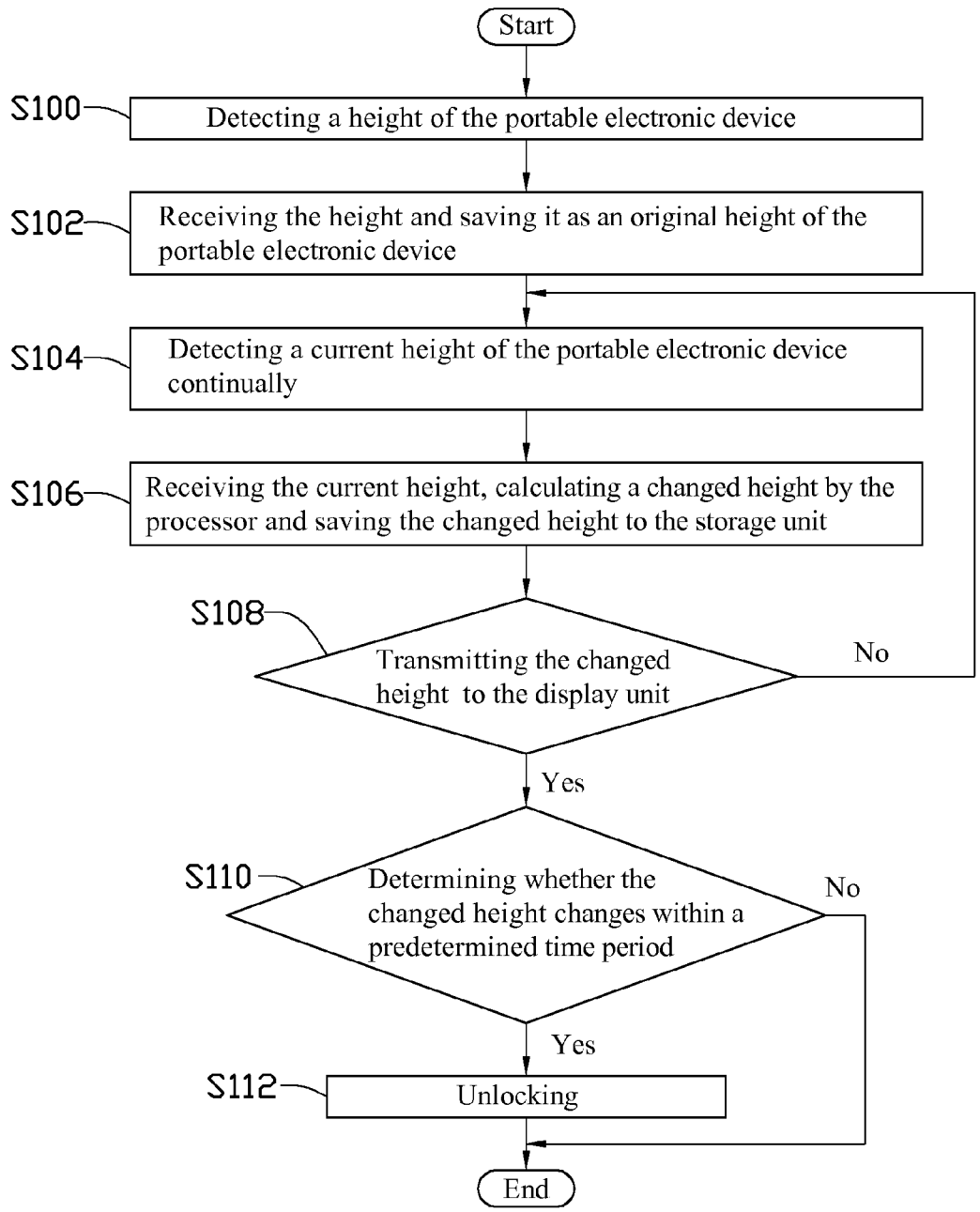
FIG. 3 is a flowchart of one embodiment of a method for unlocking a portable electronic device.

FIG. 3 is a flowchart of one embodiment of a method for unlocking a portable electronic device 1.

In block S100, the altimeter 11 detects a height of the portable electronic device 1.

In block S102, the receiving module 102 receives the height of the portable electronic device 1 and saves it as an original height of the portable electronic device 1 to the storage unit 13.

In block S104, the altimeter 11 continually detects the height of the portable electronic device 1.

In block S106, the receiving module 102 receives the detected height of the portable electronic device 1 from the altimeter 11. The processor 12 calculates a changed height of the portable electronic device 1 based on the original height and the detected height of the portable electronic device 1. The receiving module 102 saves the changed height to the storage unit 13.

In block S108, the transmission module 103 transmits the changed height of the portable electronic device 1 to the display unit 14.

In block S110, the checking module 104 determines whether the changed height stored in the storage unit changes within a predetermined time period. If no change, the checking module 104 determines the movement of unlocking the portable electronic device 1 is finished and block S112 is implemented. If changes, the checking module 104 determines the movement of the portable electronic device 1 is continually moving and block S104 is returned.

In block S112, the determination module 105 determines whether the changed height is same to a predetermined changed height of the portable electronic device 1. In one embodiment, the determination module 105 reads the changed height and the predetermined changed height stored in the storage unit 13 and determines whether the changed height is equal to the predetermined changed height. If not, the procedure is ended and the portable electronic device 1 keeps unlocking. If same, the determination module 105 sends an unlocking signal to the unlocking module 106 and block S114 is implemented.

In block S114, the unlocking module 106 unlocks the portable electronic device 1. For example, the unlocking module 106 unlocks the portable electronic device 1 by unlocking a screen lock or a key lock.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A portable electronic device, comprising:
a storage unit;
a display unit;
at least one processor;
an altimeter operable to detect a height of the portable electronic device;
one or more programs stored in the storage system and being executable by the at least one processor, the one or more programs comprising:
a setting module operable to set a predetermined changed height and a predetermined time period for unlocking the portable electronic device;
a receiving module operable to receive the height of the portable electronic device and a changed height of the portable electronic device and save the height and the changed height to the storage unit;
a checking module operable to determine whether the changed height stored in the storage unit changed within a predetermined time period;
a determination module operable to determine whether the changed height is the same as a predetermined changed height if the changed height changed within the predetermined time period; and
an unlocking module operable to unlock the portable electronic device if the changed height is the same as the predetermined changed height.

2. The portable electronic device of claim 1, the one or more programs further comprises:
a transmission module operable to transmit the changed height to the display unit.

3. The portable electronic device of claim 1, wherein the unlocking module unlocks the portable electronic device by unlocking a screen lock or a key lock.

4. An computer-implemented method for unlocking a portable electronic device, the portable electronic device comprising a storage unit, a display unit and at least one processor, the method comprising:
detecting a height of the portable electronic device;
receiving the height and saving it as an original height to the storage unit;
detecting the height of portable electronic device by an altimeter continually;
receiving the detected height from the altimeter, calculating a changed height by the processor and saving the changed height to the storage unit;
determining whether the changed height stored in the storage unit changed within a predetermined time period;
determining whether the changed height is the same as a predetermined changed height if the changed height changed within the predetermined time period; and
unlocking the portable electronic device if the changed height is the same as the predetermined changed height.

5. The method of claim 4, further comprising:
transmitting the changed height of the portable electronic device to the display unit.

6. The method of claim 4, wherein the step of unlocking the portable electronic device is by unlocking a screen lock or a key lock.

7. The method of claim 6, further comprising:
setting the predetermined time period for unlocking the portable electronic device and saving the predetermined time period to the storage unit.

8. The method of claim 6, further comprising the following steps to set the predetermined changed height for unlocking the portable electronic device:
moving the portable electronic device in an up-down direction;
detecting the height of the portable electronic device by the altimeter;
receiving the height and saving it as an original height to the storage unit;
detecting the height of portable electronic device by the altimeter continually; and
calculating the predetermined changed height by a processor and saving it to the storage unit.

* * * * *